Patented Sept. 5, 1933

1,925,434

UNITED STATES PATENT OFFICE 1,925,434

AZO DYESTUFFS CONTAINING CHROMIUM

Heinrich Clingestein, Cologne-on-the-Rhine, and Karl Wiedemann, Cologne-Mulheim, Germany, assignors to General Aniline Works, Inc., New York, N. Y., a corporation of Delaware No Drawing. Application July 16, 1929, Serial No. 378,809, and in Germany July 26, 1928

5 Claims. (Cl. 260—12)

The present invention relates to azo dyestuffs containing chromium. More particularly it relates to azo dyestuffs which may be represented by the probable general formula:

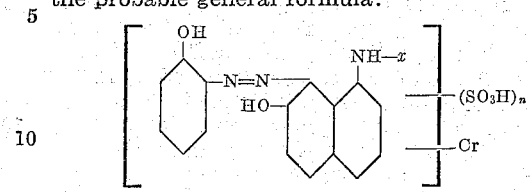

wherein $x$ stands for an acyl group, such as an acetyl or benzoyl group or for a hydrogen atom, $n$ stands for one of the numbers one and two, the sulfonic acid group or groups being attached to the benzene and/or naphthalene nucleus, and wherein the benzene and the naphthalene nuclei may be further substituted by halogen, alkyl or the nitro group.

The starting dyestuffs are obtainable by coupling in the usual manner a diazotized o-amino-phenol or sulfonic acid thereof with a 1.7-amino-naphthol or a 1.7-aminonaphthol sulfonic acid or with a N-acyl derivative or a sulfonic acid thereof. The dyestuffs containing the free amino group may otherwise be obtained by coupling the diazotized o-amino-phenol or a sulfonic acid thereof with a N-acyl-derivative of a 1.7-amino-naphthol or a sulfonic acid thereof and splitting off the acyl group in the usual manner by heating in a diluted acid or in diluted caustic alkali solution.

The chroming of the dyestuffs above identified is effected by adding to an aqueous solution or a suspension of one of said dyestuffs the necessary quantity of a suitable chromium compound and boiling the mixture, favorably under reflux, for several hours, until the original color change with sodium carbonate can no longer be detected. Generally we add such a quantity of the chromium compound that for each dyestuff molecule at least about one chromium atom is present. Suitable chromium compounds for carrying out the process are for example, chromic fluoride, chromium-formate, -acetate and -sulfate. The new chromium compounds are obtained from their solutions by salting out. Their alkali metal salts are in the dry pulverized form generally bluish-black lustrous powders, soluble in water, dyeing wool from an acid bath grey to blue to violet even shades of excellent fastness to fulling and light.

The invention is illustrated by the following examples, without being restricted thereto:

Example 1.—22.4 parts by weight of 4-chloro-2-amino-1-hydroxybenzene-6-sulfonic acid are diazotized and coupled in the presence of lime and pyridine with 16 parts of 1-amino-7-naphthol. After removal of the lime, chroming is carried out in the customary manner, as for example, by making a paste with water and boiling in the presence or absence of acetate with a chromic fluoride solution, containing 20 parts by weight of $Cr_2O_3$, until the original color change with sodium carbonate disappears. The salted out and dried dyestuff which may be represented by the following formula:

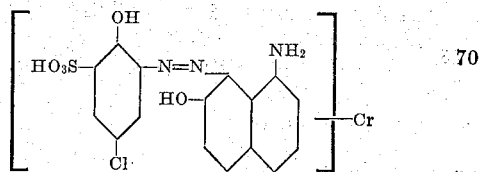

is a dark powder, readily soluble in water with a blue coloration. It dyes wool from an acid bath in clear greenish blue-grey shades of good fastness and evenness.

Example 2.—22.4 parts by weight of 4-chloro-2-amino-1-hydroxybenzene-6-sulfonic acid are diazotized and coupled with 20.1 parts by weight of 1-acetylamino-7-naphthol and then chromed as indicated in Example 1. The dyestuff which may be represented by the following formula:

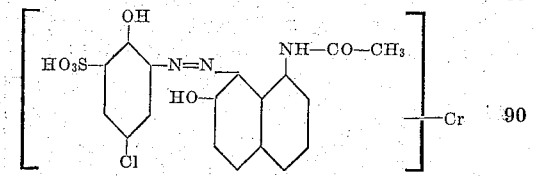

is readily soluble with a blue coloration and dyes wool blue from an acid bath. The even dyeings are fast to washing, fulling and light.

Example 3.—When the dyestuff obtained according to Example 2 is saponified before the chroming by boiling with 20% sulfuric acid, dyeings similar to those of Example 1 are obtained.

Example 4.—23.2 parts by weight of 6-nitro-2-amino-1-hydroxybenzene-4-sulfonic acid are diazotized and coupled with 20.1 parts by weight of 1-acetyl-amino-7-naphthol and the isolated dyestuff is chromed as described in Example 1. It dyes wool a fast blue grey.

Example 5.—20.3 parts by weight of 3-amino-4-hydroxy-1-methylbenzene-5-sulfonic acid are diazotized and coupled with 20.1 parts by weight of 1-acetylamino-7-naphthol and the dyestuff obtained is chromed as described in Example 1. It dyes wool from an acid bath fast blue shades of good evenness.

Example 6.—The dyestuff obtained according to Example 5 is saponified before the chroming by means of 20% sulfuric acid. The resulting dyestuff dyes wool bluish-grey with similar fastness properties.

Example 7.—18.9 parts by weight of 2-amino-1-hydroxybenzene-4-sulfonic acid are diazotized and coupled with 20.1 parts by weight of 1-acetylamino-7-naphthol. The dyestuff is chromed as described in Example 1. The dry pulverized dyestuff having in the free state the formula:

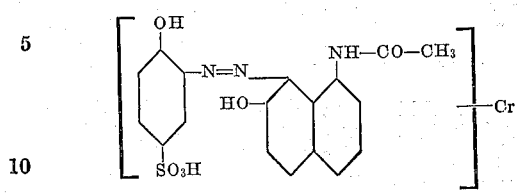

is a bluish-black powder, easily soluble in water with a violet coloration and dyeing wool from an acid bath even reddish-grey shades of good fastness properties.

Example 8.—14.4 parts by weight of 4-chloro-2-amino-1-hydroxybenzene are diazotized and coupled with 28.1 parts by weight of 1-acetylamino-7-naphthol-4-sulfonic acid. The dyestuff is chromed as described in Example 1, in a dry pulverized form it is a bluish powder, easily soluble with a reddish-blue coloration and dyeing wool from an acid bath bluish-grey shades of good fastness properties. The chromium compound may be represented by the following formula:

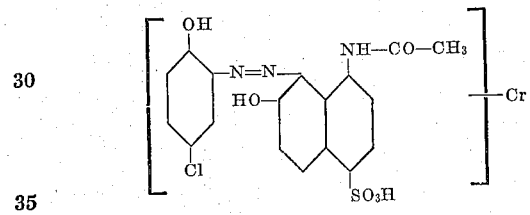

Example 9.—The diazo-compound prepared from 22.4 parts by weight of 4-chloro-2-amino-1-hydroxybenzene-6-sulfonic acid is coupled with 28.1 parts by weight of 1-acetylamino-7-naphthol-4-sulfonic acid and the dyestuff is chromed as described in Example 1. The dyestuff thus obtained having the probable formula:

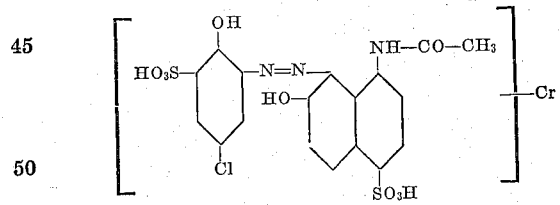

is easily soluble in water and dyes wool from an acid bath bluish-grey shades.

We claim:
1. As chromium complex compounds azo dyestuffs of the probable general formula:

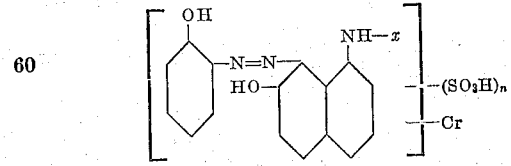

wherein $x$ stands for an acidyl group or a hydrogen atom, $n$ stands for one of the numbers one and two, the sulfonic acid group or groups being attached to the benzene and/or naphthalene nucleus, and wherein the benzene and naphthalene nuclei may be further substituted by substituents selected from the group consisting of halogen, alkyl and the nitro group, being in the form of their alkali metal salts generally bluish-black lustrous powders, easily soluble in water and dyeing wool from an acid bath grey to blue to violet even shades of good fastness to fulling and light.

2. As chromium complex compounds azo dyestuffs of the probable general formula:

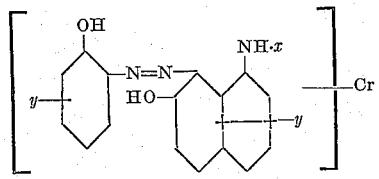

wherein $x$ stands for an acidyl group or a hydrogen atom, $y$ stands for sulfonic acid groups one of which may be substituted by a hydrogen atom and wherein the benzene and naphthalene nuclei may be further substituted by substituents selected from the group consisting of halogen, alkyl and the nitro group, being in the form of their alkali metal salts generally bluish-black lustrous powders, easily soluble in water and dyeing wool from an acid bath grey to blue to violet even shades of good fastness to fulling and light.

3. As chromium complex compounds azo dyestuffs of the probable general formula:

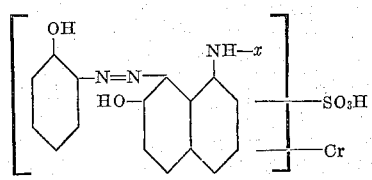

wherein $x$ stands for an acidyl group or a hydrogen atom, the sulfonic acid group being attached to the benzene or naphthalene nucleus, and wherein the benzene and naphthalene nuclei may be further substituted by substituents selected from the group consisting of halogen, alkyl and the nitro group, being in the form of their alkali metal salts, generally bluish-black lustrous powders, easily soluble in water and dyeing wool from an acid bath grey to blue to violet even shades of good fastness to fulling and light.

4. As a chromium complex compound the azo dyestuff of the probable formula:

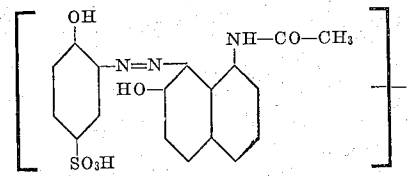

being a bluish-black powder, easily soluble in water with a violet coloration and dyeing wool from an acid bath even reddish-grey shades of good fastness properties.

5. As a chromium complex compound the azo dyestuff of the probable formula:

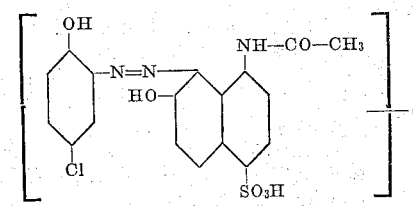

being in the dry pulverized form a bluish powder, easily soluble in water with a reddish-blue coloration and dyeing wool from an acid bath bluish-grey shades of good fastness properties.

HEINRICH CLINGESTEIN. [L. S.]
KARL WIEDEMANN. [L. S.]